United States Patent [19]

Frush

[11] Patent Number: 4,691,897

[45] Date of Patent: Sep. 8, 1987

[54] RAIL LOCK DEVICE FOR TUBULAR FENCE

[75] Inventor: Donald R. Frush, Warsaw, Ind.

[73] Assignee: CTB, Inc., Milford, Ind.

[21] Appl. No.: 840,891

[22] Filed: Mar. 18, 1986

[51] Int. Cl.[4] ............................................. E04H 17/14
[52] U.S. Cl. ........................................ 256/65; 403/255
[58] Field of Search .................... 256/65, 66; 403/252, 403/255

[56] References Cited

U.S. PATENT DOCUMENTS

| 998,582 | 7/1911 | Lucas | 403/252 X |
| 3,338,602 | 8/1967 | Arnd | 403/252 |
| 4,007,919 | 2/1977 | Totten | 256/65 X |
| 4,063,836 | 12/1977 | Militano | 256/65 X |
| 4,468,067 | 8/1984 | Jenkins | 403/252 X |

OTHER PUBLICATIONS

Tubular Hi-Polymer Fence-Installation Instruction and Parts List, CTB, Inc. 1985.

Primary Examiner—Andrew V. Kundrat
Attorney, Agent, or Firm—Trexler, Bushnell, Giangiorgi & Blackstone, Ltd.

[57] ABSTRACT

A releasable rail locking device for a tubular fence comprises first and second substantially identical elongate flexible legs joined at a predetermined angle to define a generally V-shaped flexibe bow-like portion elastically deformable to a predetermined range of angles about this predetermined angle. The legs terminate in respective oppositely oriented outwardly extending gripping portions for releasably grippingly engaging a wall of a tubular fence rail member about aligned through apertures therein. Each of the gripping portions comprises a body portion extending from the associated leg and an enlarged head portion extending from the body portion to define a shoulder therewith. Both the head portion and body portions as well as the bow-like portion are sized to extend the heads and bodies through the through apertures in the tubular fence rail wall while maintaining the bow-like portion in a partially compressed condition, at an angle somewhat less than the predetermined angle. Each head portion defines a cam lead-in surface for facilitating snapping engagement thereof with the tubular fence rail wall about the apertures upon inward flexing and subsequent release of the bow-like portion.

14 Claims, 6 Drawing Figures

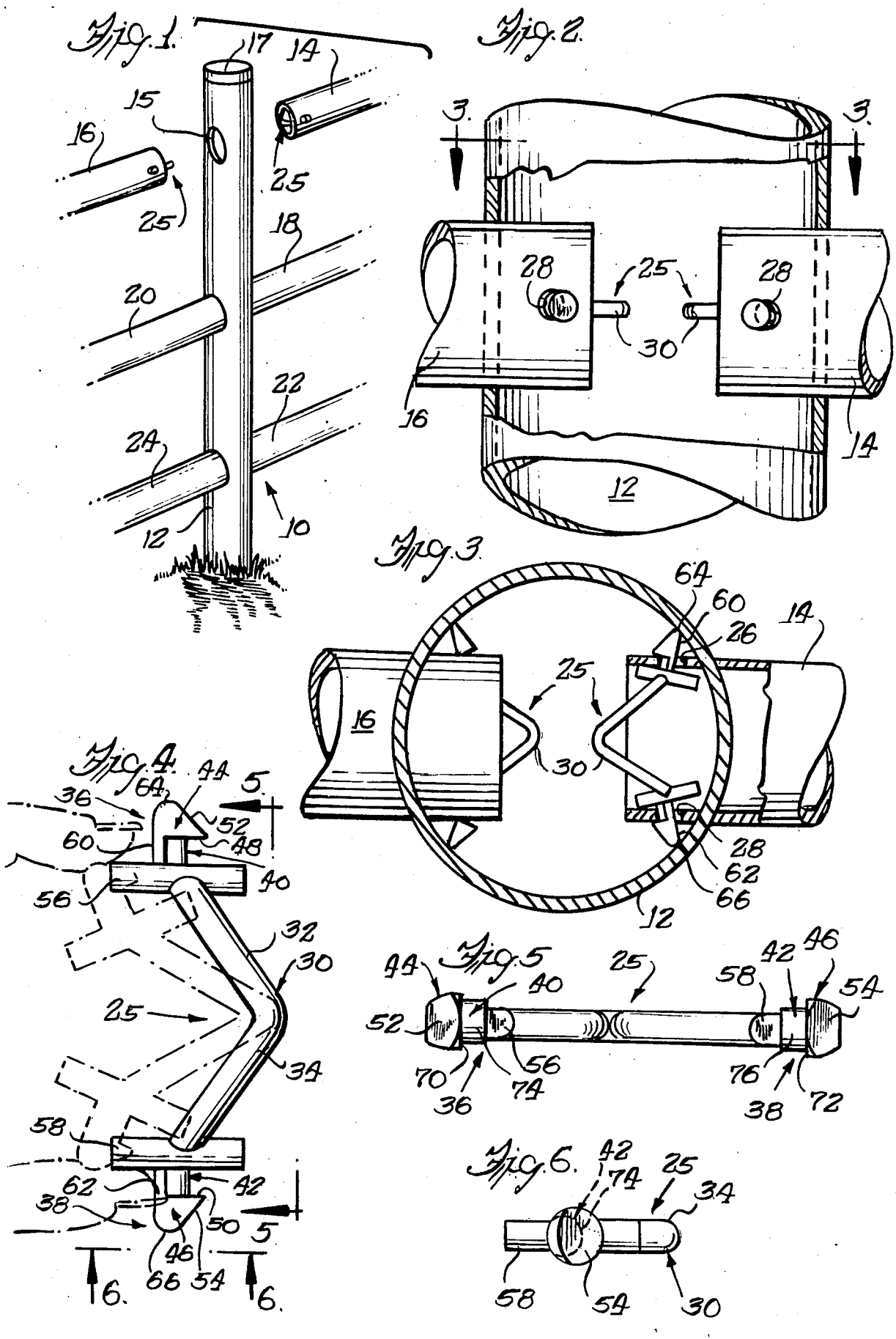

RAIL LOCK DEVICE FOR TUBULAR FENCE

BACKGROUND OF THE INVENTION

This invention relates to a novel post-and-rail type of fence assembly comprised of tubular post and rail members and more particularly to a novel rail lock device for locking respective rail ends to respective posts of such a fence structure.

Post-and-rail type fences generally comprise a plurality of vertically oriented posts set into the ground at desired intervals, and one or more generally horizontal rails extending intermediate the respective spaced-apart posts. Such fencing may be constructed of various materials including wood and various metals.

Recently, however, a novel post and rail type of fence installation has been proposed utilizing tubular members of high polymer plastics materials. In this novel fence structure, the respective vertical or line posts are constructed of relatively thick-walled cylindrical tubes of a suitable high-polymer plastics material, which may advantageously be cut to desired lengths from continuously extruded material as desired. Similarly, the horizontal rail members are formed from similar material of somewhat lesser diameter and in a similar fashion so as to extend into suitable bores or openings provided therefor in the respective line posts.

The coupling together of the rails with the respective line posts requires some additional coupling or locking device.

Such a coupling or locking device should ideally be relatively simple in its construction and easy to install. However, the locking device should also ideally resist withdrawal once the rails are assembled with the line posts, to prevent accidental disassembly thereof. Hence, the locking provided by such a device or arrangement should be positive, once assembled with the rails and posts. However, again ideally, release of such a locking device, should also be relatively simple so as to permit ready removal and/or replacement of one or more fence rails when desired.

One particularly successful tubular high-polymer fence assembly of the foregoing type is available for example from CTB, Inc., P.O. Box 632, State Road 15 North, Milford, Ind. 46542. This fence assembly also provides a relatively simple bow-shaped locking device which is adapted to be flexibly compressed inwardly so as to enter the interior of the tubular fence rail member. Cooperatively, the fence rail member is provided with diametrically aligned through apertures, through which projecting end portions of the bow-shaped locking device extend when the compression or flexion thereof is released or relaxed. The locking device is provided with a pair of diametrically opposed outwardly extending arm portions which extend through the opposed through apertures of the tubular rail. Raised abutment portions are provided immediately behind these extensions or arms so as to substantially center the device within the rail with the arms projecting through the through apertures to either side. These abutment or stop portions are preferably spaced apart by an amount substantially similar to the inner diameter of the rail.

Cooperatively, the line posts are provided with circular through apertures of somewhat greater diameter than the outer diameter of the rails to receive the rails therethrough. The locking devices are therefore compressed during insertion of the rail into the line post aperture and thereafter resiliently return to extend the arms outwardly through either through aperture of the rail to thereafter resist removal thereof back through the line post aperture.

While the foregoing system has proven advantageous in many respects, there remains room for yet further improvement. In particular, there remains room for further improvement in the locking device, to assure both simplified assembly and disassembly, when desired, of the rails with respect to the line posts. Moreover, the above-described locking device has been found susceptible to failure under certain conditions of extreme stress or impact upon the fence rails, and hence there is room for further improvement in this regard as well.

OBJECTS OF THE INVENTION

Accordingly, it is a general object of the invention to provide a novel and improved rail locking device for a tubular fence construction.

A related object is to provide a rail locking device in accordance with the foregoing objects which is relatively simple to install manually without the need for any tools, and may also be relatively simply disconnected or disassembled, when desired, to permit disassembly of the associated rail member from the associated line posts, with the use of but minimum and simple tools, and yet resists removal of the rail from the line post even upon substantial impact and force applied to the rail itself.

A related object is to provide a rail lock device in accordance with the foregoing objects, which is relatively simple and inexpensive in its design and manufacture and yet highly reliable in operation.

BRIEF DESCRIPITON OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in the several figures of which like reference numerals identify like elements, and in which:

FIG. 1 is a partial perspective view illustrating a tubular fence construction in connection with which a releasable rail locking device in accordance with the invention is advantageously utilized;

FIG. 2 is an enlarged broken-away side elevation illustrating a portion of the tubular fence structure of FIG. 1, and illustrating further details of the coupling of rail thereof to a line post thereof, utilizing the rail locking device of the invention;

FIG. 3 is a sectional view, partially broken away, taken generally in the plane of the line 3—3 of FIG. 2;

FIG. 4 is a top plan view of the rail locking device of the invention;

FIG. 5 is a side elevation taken generally in the plane of the line 5—5 of FIG. 4;

FIG. 6 is an end view taken generally in the plane of the line 6—6 of FIG. 4; and

DETAILED DESCRIPTION OF THE ILLUSTRATED EMBODIMENT

Referring now to the drawings, and initially to FIGS. 1-3, a tubular fence assembly or construction is designated generally by the reference numeral 10. This fence assembly includes a line post 12 and a plurality of rails 14, 16, 18, 20, 22 and 24 which are joined with the line post 12 to form a post-and-rail type of fence assembly. Advantageously, a releasable rail locking device in accordance with the invention, designated generally by the reference numeral 25, is provided at an end portion of each of the fence rails to permit releasable locking thereof with the line post 10. Preferably, the line post 12 and each of the rails 14, 16, etc. comprise cylindrical elongate tubular members formed from a high polymer plastics material.

In assembling the fence rails 14, 16, etc., with line post 12, one of the locking devices 25 of the invention is initially preassembled with a free end portion of the fence rail member. The line posts 12 are provided with respective enlarged through openings or bores 15 for receiving end parts of the respective rails 14, 16, etc., therethrough. Accordingly, an outer end portion of each fence rail member is provided with a pair of aligned diametrically opposed through apertures 26, 28 for receiving portions of the locking devices 25 therethrough as will be more fully described hereinbelow.

Referring now also to FIGS. 4-6, the releasable rail-locking device 25 will be seen to comprise a generally V-shaped flexible, bow-like portion or member 30 defined by a pair of elongate flexible legs 32 and 34, joined together at a predetermined angle. This bow-like member is elastically deformable to a predetermined range of angles about the predetermined angle at which it is initially formed.

The respective legs 32, 34 terminate in respective oppositely oriented outwardly extending gripping portions designated generally by reference numerals 36 and 38. As best viewed in FIG. 3, these gripping portions releasingly grippingly engage respective walls of the tubular rail members 14 and 16 about the respective aligned through apertures 26, 28 therein.

To this end, each of the gripping portions comprises a base or body portion 40, 42 which extends from the associated leg and a further, enlarged head portion 44, 46 which extends from the body portion so as to define a shoulder 48, 50 therewith. As best viewed in FIG. 3, both the head portions and body portions are sized to freely enter and extend through the through apertures 26, 28 in the tubular fence rail walls. Moreover, upon extension of the bow-like portion 30 toward its relaxed or unstressed state, illustrated in solid line in FIGS. 4 and 5, the bodies 40, 42 and heads 44, 46 will extend through these apertures upon coming into alignment therewith while the bow-like portion 30 remains slightly flexed, as best viewed in FIG. 3. That is, the effective length of the bow-like portion 30 when in its relaxed or fully extended state is sufficient to assure that it remains somewhat flexed upon engagement of respective gripping portions 36, 38 with, and extension of the head and body portions through, the respective apertures 26, 28.

Advantageously, the head portions 44, 46 further define respective ramp-like or cam lead-in surfaces 52, 54 to facilitate initial entry thereof for snapping engagement of the respective heads at shoulders 48, 50 with the tubular fence rail wall about the respective apertures 26, 28 upon initial inward compressive flexing and subsequent release of the bow-like portion 30. Preferably, the releasable locking device 25 comprises a one-piece integrally formed structure, which may be molded or otherwise formed from a suitable flexible plastics material. Preferably, the cam lead-in surfaces 52, 54 comprise surfaces of the head portion 44, 46 which diverge generally angularly inwardly from the free outer ends thereof, to a cross-sectional dimension greater than that of the body portions 40, 42 to thereby define the shoulders 48, 50 therewith.

The gripping portions 36, 38 further include respective abutment portions 56, 58 which are generally parallel to and spaced apart from the respective head portions 44, 46 so as to generally define an opposite side surface of a generally U-shaped notch with each shoulder 48, 50. More specifically, these abutment portions extend laterally outwardly to either side of the respective body portions 40, 42, and generally in a plane defined by the bow-like member or portion 30, so as to abut inner surfaces of the tubular fence rail wall to one side of the through apertures 26 and 28 therein, due to the slight flexing of bowlike portion 30, as best viewed in FIG. 3.

In the embodiment illustrated, the respective head and body portions further define respective generally smooth continuous surfaces 60, 62 which extend from the abutment members 56, 58 outwardly to the free outer ends of the respective head portions at a surface thereof generally opposite the surface or surfaces where the shoulders 48, 50 are formed. The cam lead-in surfaces 52, 54 thus generally diverge from where they meet the smooth continuous surfaces 60, 62 at their free outer ends. Preferably however, the endmost portions of the respective heads 44, 46 are provided with relatively smooth, rounded surfaces 64, 66 intermediate the respective surfaces 60, 62 and cam lead-in surfaces 52, 54. These rounded ends facilitate initial entry of the device into the rails 14, 16, and also sliding of the rounded ends thereof along the inner surfaces of the rail to reach the through apertures 26, 28.

In other words, and as best viewed in FIGS. 5 and 6, each head portion 44, 46 defines a generally crescent-shaped surface 70, 72 of a given diameter where it is joined to the respective body portion 40, 42, which annular surface generally defines the shoulder 48, 50. The body portion 40, 42 defines a first semi-cylindrical surface of like diameter to that of the head portion about portions thereof which define the smooth continuous surfaces 60, 62 thereof. However, the body portion preferably defines a reduced diameter, generally U-shaped surface about the remainder thereof, with the crescent-shaped surfaces 70, 72 being at a substantially right angle thereto about a major fraction of the periphery of the base portion. This second U-shaped surface portion is designated generally by reference numerals 74, 76.

Preferably, the angle defined by the respective cam lead-in surfaces 52 and 54 relative to the axes and/or continuous surfaces 60, 62 of the bodies 40 and 42 is substantially on the order of 45 degrees. Moreover, it will be seen that the abutment members or portions 56 and 58 are also generally parallel to and spaced apart from the crescent-shaped surfaces 70, 72 of the respective head portions so as to define the opposite side surface of a U-shaped notch. The abutment members are elongate members, as mentioned, which preferably present relatively elongate, linear and preferably planar surfaces to either side of the base portion so as to provide respective abutment surfaces to either side of through apertures 26, 28 interiorly of the rail 14, with the body portions extending therethrough.

In operation, the releasable locking devices of the invention as described above facilitate both assembly and, when desired, disassembly of the described rail-and-post type of fence structure with a minimum of effort and requiring relatively few and simple tools. However, the described releasable locking members advantageously provide a high degree of resistance to forces otherwise tending to dislodge the rails from the line posts, once in place.

In this latter regard, it will be seen that when fully assembled as best viewed in FIG. 3, the generally flat, continuous rear surfaces 60, 62 of the respective heads face the inner surfaces of the rails 14, 16, etc. about the through bores 15 therein. In particular, the rounded end surfaces 64, 66 abut the inner wall surfaces of line post 12 to either side of through bore 15 therein. Hence, the cam or ramp-like surfaces 52, 54 face away from the through bores 15, discouraging camming thereof and responsive flexing action of the bow-like bodies 30. Moreover, the notch portions 48 and 50 tend to engage the inner and outer walls of the rails about the through apertures therein thus further discouraging or opposing inward flexing of the bow-like bodies 30 in response to forces applied to ends 64, 66 when forces tending to pull the rails out of or away from the line posts are applied.

In contrast, assembly is greatly simplified and facilitated by the structure of the invention. That is, the device 25 may be readily gripped, as illustrated in phantom line in FIG. 4 and flexed inwardly to permit initial insertion thereof through an open end of one of the rails 14, 6, etc. Thereafter the rounded ends permit sliding of the device 25 along the inner surface of the rail until the ends come into alignment with the through apertures 26, 28. Thereupon, the bow-like portion tends to resiliently return in the direction of its unflexed condition to extend the head 36 and 38 through the apertures. Thereupon, the locking device is rotated substantially 180 degrees to the position illustrated in FIGS. 2 and 3 for assembly with the line post 12. This rotation can be easily accomplished by manually reaching into the open end of the rail and grasping and rotating the bow-like portions 30.

In this regard, the slightly inwardly flexed or compressed condition of the bow-like portion 30, when assembled with rails 14, 16 as illustrated tends to define a togglelike action between rest or stable positions thereof. These rest positions are generally 180 degrees apart, with the V-shaped bow portion directed either directly into or directly out of the rail. That is, stable positions are achieved when the bow-like portion 30 lies in the diametric cross-sectional plane of the rail. Generally speaking, the abutment portions 56 and 58 provide this stabilizing action, in cooperation with the flexing or tension on bow-like portion 30 when the device is installed in the rail. Since, as best viewed in FIG. 3, the abutment portions 58, 60 are slightly angled relative to the interior walls of the rails when the locking devices are assembled with the head portions thereof extending through the apertures 26, 28, the forces exerted on them by flexed bow-like portion 30 define this toggle-like action.

Upon the 180 degree rotation of the locking device 25, assembly of the rail 14 with the line post 10 at through bore 15 thereof, is relatively simple. The end portions 64 and 66 may be manually inwardly depressed somewhat if desired to further facilitate initial contact of these ends with the bore 15. However, the cam or ramp-like surfaces 52 and 54 tend to facilitate the necessary further inward flexing of the bow-like portions 30 to permit resilient compression and withdrawal of heads 36 and 38 sufficiently to permit passage through the bore 15. In this regard, it will be noted that through apertures 26 and 8 are of sufficient diameter to permit the passage of the head portions therethrough at somewhat of an angle or tilted condition, as illustrated for example in FIG. 3.

Removal of a rail such as rail 14, if desired, is also greatly simplified by the invention. In this regard, the line post 12 is preferably provided with an end cap 17, preferably frictionally engaged or press-fitted thereto, such that it may be removed manually or by a suitable tool. Upon removal thereof, it is a relatively simple matter to reach within the post, either manually or with a suitable elongate tool, for engaging and rotating the protruding bow-like members or portions 30, as best viewed in FIGS. 2 and 3. Upon assembly of the rails with the line posts the V-shaped ends of portions 30 extend into the open central portion of the line post. As mentioned above, it is a relatively simple matter to rotate the bow-like portions substantially 180 degrees due to their toggle-like action. Once so rotated, the rail may be withdrawn by exerting a relatively sharp outward pulling force thereupon, which will cause the cam or ramp-like surfaces 50, 52 to engage the edges of bore 15, inwardly compressing bow-like portion 30, and withdrawing heads 36, 38 to permit passage thereof through the bore 15.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall with the true spirit and scope of the invention.

The invention is claimed as follows:

1. A releaseable rail locking device for a tubular fence comprising:

first and second substantially identical elongate flexible legs joined at a predetermined angle to define a generally V-shaped flexible bow-like portion elastically deformable to a predetermined range of angles about said predetermined angle;

said legs terminating in respective oppositely oriented outwardly extending gripping portions for releasably grippingly engaging a wall of a tubular fence rail member internally and externally about aligned through apertures therein; each of said gripping portions comprising a body portion extending from the associated leg and an enlarged head portion extending from the body portion to define a shoulder therewith, both said head portions and said body portions as well as said bow-like portion being sized to extend the heads and bodies through said through apertures in said tubular fence rail wall upon extension of said bow-like portion toward said predetermined angle while maintaining said bow-like portion in a partially compressed condition, at an angle somewhat less than said predetermed angle, upon full extension of said bodies therethrough; enabling said bow-like portion to be easily rotatable substantially 180 degrees when assemblyed with said rail member and with said gripping portions configured to encourage toggle-like action of said device between a first portion wherein said bow-like portion is directed into said rail member and a second position wherein said bow-like portion is directed out of said rail member; said head portion defining a cam lead-in surface for facilitating snapping engagement of said head with said tubular fence rail wall about said apertures upon inward flexing and subsequent release of said bow-like portion and enabling said tubular fence rail member fitted with said rail locking device to be easily inserted into and removed from an associated tubular fence post.

2. A device according to claim 1 wherein said tubular fence rail member has a predetermined inner diameter, said through apertures being diametrically opposed, and wherein the effective length of said bow-like portion is sufficient for assuring extension of said head and body portions into and through said through apertures; said bow-like member being sufficiently elastically compressible to permit insertion of said device within said tubular member prior to extension of the gripping portions through the diametrically opposed through apertures.

3. A device according to claim 1 wherein said device comprises a one-piece integrally formed structure.

4. A device according to claim 1 wherein said head and body portions define a first surface which forms a smooth continuous surface to a free outer end of said head portion; and wherein said cam lead-in surface is defined by a second surface of said head portion which diverges angularly from said free outer end to a cross-sectional dimension greater than that of said body portion to define one side surface of a notch therewith.

5. A device according to claim 4 wherein said head portion defines a generally annular inner end surface of a given diameter where it is joined to said body portion, and wherein said body portion defines a first semi-cylindrical surface of like diameter to said end portion about said smooth continuous surface and a reduced diameter, generally U-shaped portion about the remainder thereof with said annular surface at a substantially right angle thereto to thereby define one side surface of said notch about a major fractional portion of the periphery of said base portion.

6. A device according to claim 1 wherein each said gripping portion further includes an abutment portion generally parallel to and spaced apart from said shoulder portion so as to define a generally U-shaped notch.

7. A device according to claim 6 wherein said abutment portion extends laterally outwardly to either side of said body portion in a plane defined by said bow-like portion for abutting an inner surface of said tubular fence rail wall to one side of said through aperture therein.

8. A device according to claim 5 wherein each said gripping portion further includes an abutment portion generally parallel to and spaced apart from said annular surface of said head portion so as to define a generally U-shaped notch.

9. A device according to claim 8 wherein said abutment portion comprises an elongate member which extends laterally outwardly to either side of said body portion and in the plane of said bow-like portion for abutting an inner surface of said tubular fence rail wall to one dside of said through aperture therein.

10. A device according to claim 9 wherein said abutment portion presents a relatively elongate linear surface to either side of said base portion parallel to and spaced apart from said annular surface of said head portion by an amount somewhat greater than the thickness of the wall of said tubular rail member, so as to provide respective abutment surfaces to either side of said through aperture with said body portion extending therethrough.

11. A device according to claim 4 wherein said cam lead-in surface defines an angle of substantially forty-five degrees relative to the first surface of said head portion.

12. A device according to claim 10 wherein said cam lead-in surface comprises a substantially flat surface formed at an angle of substantially forty-five degrees relative to said first surface of said head portion.

13. A device according to claim 11 wherein said free outer end of said head portion has a rounded surface to facilitate sliding engagement thereof along an internal surface of said rail member en route to engagement of the locking device with the through apertures in said rail member.

14. A releasable rail locking device for a tubular fence comprising:
a generally V-shaped flexible bow-like portion elastically deformable over a predetermined range of angles;
said bow-like portion terminating in respective oppositely oriented outwardly extending gripping portions each for releasably grippingly engaging a wall internally and externally thereof of a tubular fence rail member about aligned diametrically opposed through apertures therein;
said gripping portions and said bow-like portion being sized to extend the gripping portions into engagement with said through apertures in said tubular fence rail wall while maintaining said bow-like portion in a partially compressed condition and with said gripping portions configured to encourage a toggle-like action of said device between a first position wherein said bow-like portion is directed into said rail member and a second position wherein said bow-like portion is directed out of said rail member.

* * * * *